(No Model.)
C. CHERRY, Sr.
PROCESS OF PURIFYING IRON ORE PREPARATORY TO SMELTING.
No. 290,215. Patented Dec. 18, 1883.
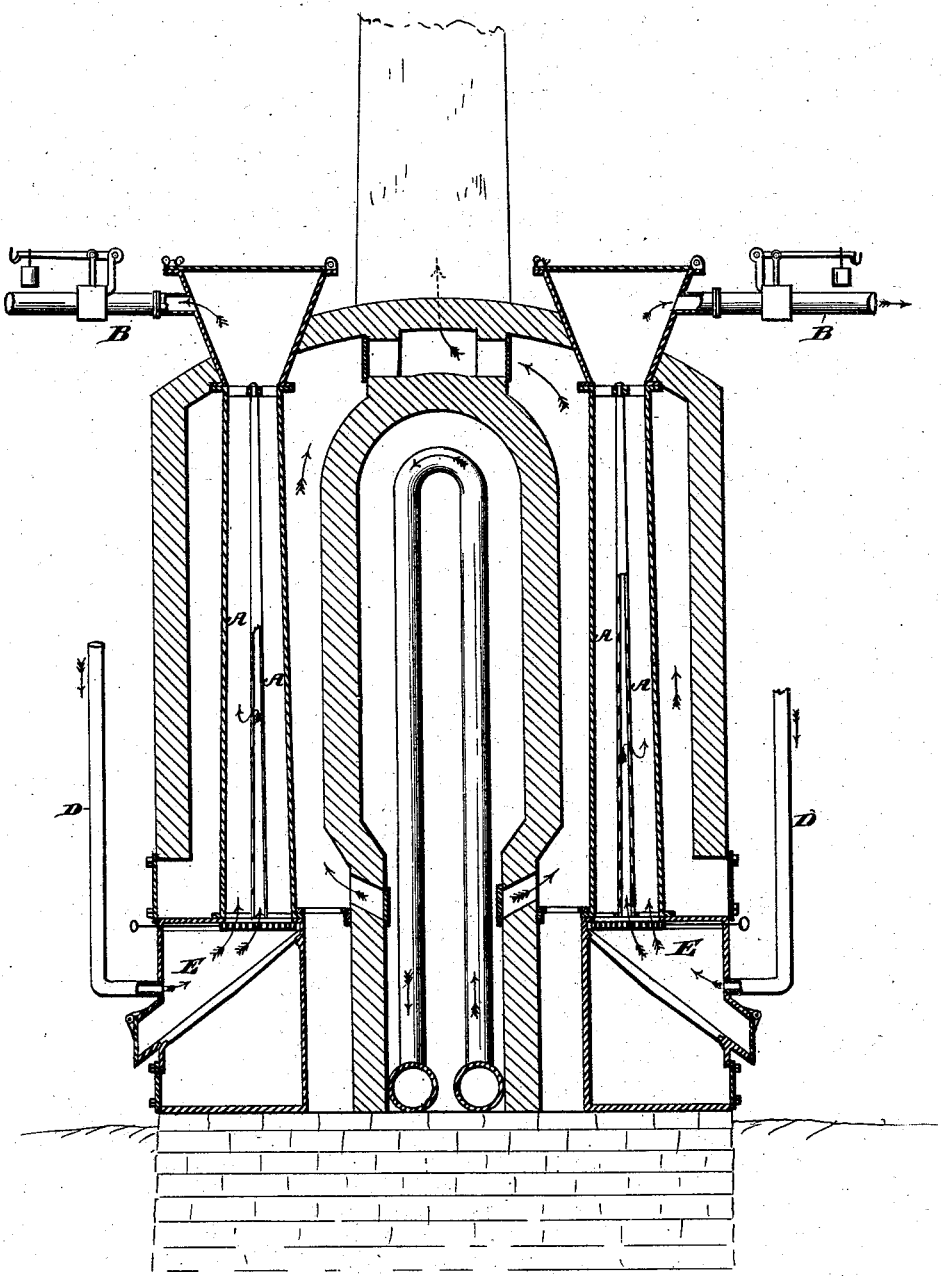
Witnesses
Robert Everett
J. A. Rutherford
Inventor
Cummings Cherry Sr.
By West & Bond
Atty

UNITED STATES PATENT OFFICE.

CUMMINGS CHERRY, SR., OF CHICAGO, ILLINOIS.

PROCESS OF PURIFYING IRON ORE PREPARATORY TO SMELTING.

SPECIFICATION forming part of Letters Patent No. 290,215, dated December 18, 1883.

Application filed September 18, 1882. (No model.)

*To all whom it may concern:*

Be it known that I, CUMMINGS CHERRY, Sr., residing at Chicago, in the county of Cook and State of Illinois, and a citizen of the United States, have invented new and useful Improvements in Processes of Purifying Iron Ores Preparatory to Smelting, of which the following is a full description.

The object of this invention is to prepare ores for smelting by freeing them of their impurities before they are placed in the furnace for reduction, the word "impurities" being used to designate all substances in combination with the metal of the ores, chemically or otherwise. It is primarily intended for the purification of iron ores, but applies equally to copper ores and similar ores capable of reoxidation.

The process consists in applying heat, hydrogen, oxygen, and chlorine to the ores in three progressive steps, in such a manner as, first, to break up their chemical union with their impurities by driving the water of constitution and of crystallization, and expelling the oxygen combined with the existing acid formations and salts and with the metal and metalloids, and deoxidizing the ores. This is done by the application of heat, as hereinafter described. Second, in forming new combinations and expelling and carrying off in gaseous form the sulphur, phosphorus, antimony, and arsenic existing in chemical combination or otherwise with the ores, such as sulphates, sulphurets, phosphates, phosphurets, &c. This is done by treating them with hydrogen, as hereinafter described. Third, in supplying said ores thus deoxidized with oxygen until they become protoxides and peroxides uniformly throughout the whole mass. This is done by treating them with atmospheric air, in the manner hereinafter described.

The accompanying drawing represents a vertical section of an apparatus for carrying out my invention, which is the subject-matter of a separate application for patent.

The ores to be treated are broken up or crushed into particles of suitable size and placed into closed retorts, muffles, or ovens A. These retorts are constructed air-tight, with a valved outlet-pipe or escape, B, which can be opened or closed, at pleasure, for the escape of all gaseous and other matters to be evaporated. This pipe may terminate in a closed chamber for condensation or otherwise. The retort is also provided with valved pipes D and gas-chamber E for the introduction, under perfect control, of gas, hydrogen, and oxygen in the form of steam and air. In case the ores are in a refractory condition, with silex and other impurities of like nature, a mixture of chloride of lime or calcium and chloride of soda and pulverized carbon is first intimately mixed with the ores and then put into the retort A with them. The retort is then subjected to heat until the ores have become of a cherry-red heat or 800° to 1000° Fahrenheit. The ores are kept in this condition and state of temperature, excluding atmospheric air, until the water of crystallization and of constitution, the oxygen, and all fugitive gases are vaporized and expelled through the valved outlet pipe or escape B, which is kept open for that purpose in such a manner as to exclude the air from entering the retort. The time required is about four hours. This part of the process, which is my first step, breaks up all acid combinations by expelling their water of constitution, which is a necessary ingredient or element to the existence of the acids found in combination with iron and similar ores. It also breaks up the oxides by expelling the oxygen. The cohesion of the ores is also destroyed by evaporating the water of crystallization, and the ores and their remaining impurities are thus left in a porous or spongy condition and prepared to act with increased chemical energy in forming the new combinations produced by the second step in my process. Where chlorine has been used, the refractory condition has been broken up, the chlorine has combined with the metallic ores, and the silica and alumina have become silicate of alumina.

The second step is as follows: The outlet or escape pipe B is then closed wholly or partially, and the application of heat is continued as before, while hydrogen and oxygen in the form of wet or superheated steam are introduced through the entrance-pipe B and gas-chamber E slowly and continuously until it has attained a pressure within the retort of not less than thirty pounds. This condition is then maintained until new chemical combinations have been formed with all the sulphur and phosphorus existing in combination with the ores or their impurities. The outlet or escape pipe B, which has in the meantime been so regulated as to maintain the pressure named, is now opened, and these new combinations pass off or are forced through it in the form of sulphureted hydrogen, phosphureted hydrogen, together with all the antimonial, arsenical, and other vapors thus formed. This condition is easily ascertained by the odor of the escaping gases through the pipes B. The oxygen of the steam has meanwhile combined with and been taken up by the metal in the ores, forming oxides and protoxides. Where salts have existed in excess in the ores to be treated, chlorine gas is introduced into the retort through the pipe D and gas-chamber E separately to break up such combination. The ores are now substantially free from sulphur, phosphorus, and any arsenic and antimony that may have been combined with them, and the metals in the ores are partially oxidized.

My third step is as follows: The escape or outlet pipe B is opened or left open, and the heat being still maintained a current of superheated air is forced through the ores through the pipes D and chamber E until said ores have become thoroughly oxidized uniformly throughout their whole mass—that is to say, the metals in the ores have taken up all the oxygen possible to be in chemical combination with them without an acid character. The ores are now ready for smelting. The ores thus treated become easy of reduction, producing, when smelted, a uniform quality of metal. Protoxide and peroxide of iron or similar metal form a fusible slag, it being a requisite condition of fusibility that one of the constituents in which the other is suspended must be fusible. It therefore follows that a peroxide, being one that has the largest possible quantity of oxygen, has most of this fusible quality, and is in consequence the most easily reduced. Another beneficial result follows from the same fact. The union of the carbon with the oxygen in the process of smelting is more complete, leaving the iron or other metal to that extent of a purer quality; and in addition to this more carbon is thus set free to unite with the metal, forming, in the case of iron, carburet of iron.

I do not claim, broadly, the roasting or application of heat to ores in closed retorts for the purpose of purification, except as in connection with the process described; nor do I claim the use of steam for roasting or for purification in the process of fusion, nor its application in closed retorts excluding atmospheric air, except in connection with the process under the pressure named, as described.

What I do claim is—

The process herein described of purifying ores previous to smelting, consisting in heating the ores or the ores and fluxes in closed retorts, muffles, or ovens and subjecting the charge thus treated to the action of steam under a pressure of not less than thirty pounds, and finally subjecting the mass to the action of superheated air for the purpose of oxidizing to peroxides, in the manner substantially as specified.

CUMMINGS CHERRY, Sr.

Witnesses:
L. L. BOND,
O. W. BOND.